May 16, 1961  N. C. BIONDI  2,984,377
FEEDING DEVICE FOR BABY BOTTLES
Filed Jan. 13, 1960

INVENTOR.
NUNZIO C. BIONDI
BY
Kane, Dalsimer and Kane
Attorneys.

United States Patent Office 2,984,377
Patented May 16, 1961

2,984,377

FEEDING DEVICE FOR BABY BOTTLES

Nunzio C. Biondi, Albany, N.Y., assignor of fifteen percent to Joseph Marino and thirty-four percent to Michael J. Harte, both of Albany, N.Y.

Filed Jan. 13, 1960, Ser. No. 2,224

7 Claims. (Cl. 215—11)

This invention has to do with improvements relating to infants feeding or nursing bottles, having particular reference to a device adapted to be used in conjunction therewith whereby a liquid, such as milk, can be drawn into the nipple whether the bottle is in a vertical up or down position, or anywhere therebetween, with a substantial portion of the milk being retained in the nipple against back-flow, and the provision of such a device and assembly is the principal object of the invention.

Generally, it is also an object of the invention to provide such a device which is economic of manufacture, simple and positive in operation, readily assembled and disassembled as also easily cleaned and sterilized, and otherwise well suited to the purposes for which it is intended.

More specifically, it is an object of the invention to provide such a device having a circular member of a diameter greater than the neck opening of a bottle and adapted to seat on the peripheral lip edge thereof to be held in position by a nipple, and a tubular member adapted to extend from adjacent the bottom of the bottle through the center of the circular member and a substantial distance into the top of the nipple to maintain the latter substantially filled with milk once the same has passed through the tube.

More specifically, it is an object of the invention to provide such a device in which said circular member is equipped with self-sealing valve means on the top side thereof to extend into the body of a nipple in order to permit the flow of milk thereto when the bottle is up-ended and to check the flow of milk therefrom when the nipple is up-ended.

Another important object of the invention is to maintain a substantial portion of milk in the nipple until the bottle has been emptied to prevent collapse of the nipple and consequent by-passing of air along the outside of the nipple while in use to help forestall such ill effects of colic or excess sucking in of air by the nursing infant.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which.

Figure 1:
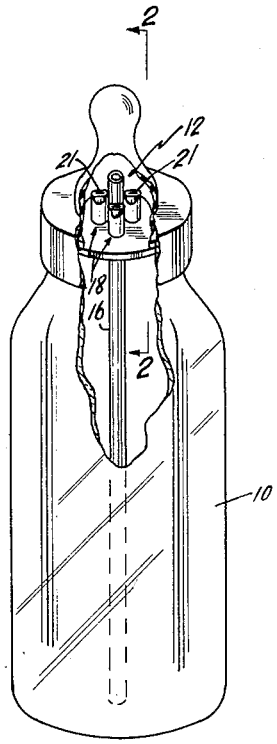
Fig. 1 is a perspective view of a bottle and nipple assembled with an embodiment of the device, with a portion broken away and in section.

Referring more particularly to the drawing, there is indicated at 10 a typical infants feeding bottle assembled with a nipple 11 and a flow control device indicated generally at 12.

The flow control device 12 comprises a circular member in the form of a disk or wafer 13 which is of a diameter greater than the neck opening of the bottle and is adapted to seat on the peripheral lip edge thereof, as shown in the drawing, to be held in position thereon by the flange 14 of the nipple 11. In order to lock the nipple in position with the disk 13 against the peripheral lip of the neck of the bottle 10, there is provided a coupling 15 that preferably is internally threaded to engage the external threads on the neck of the bottle.

Figure 2:
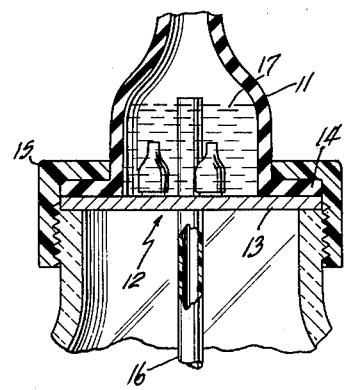
Fig. 2 is an enlarged sectional view of a fragmentary portion of the top of the assembly taken along the lines 2—2 of Fig. 1.
Figure 3:
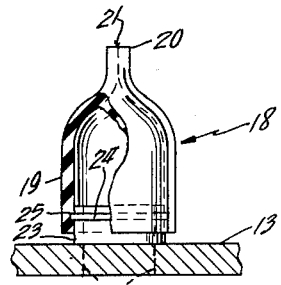
Fig. 3 is a further enlarged detail of a fragmentary portion of the disk and a self-sealing nozzle in section.

The disk 13 is provided with a tubular member 16 that preferably is flexible and of a length that is adapted to extend from adjacent the bottom of the bottle through the center of the disk and a substantial distance on the other side thereof well into the top of the nipple in order to maintain the nipple substantially filled with liquid, or milk, 17, as shown in Fig. 2, once the same has passed through the tube 16. With this type of an arrangement milk can be drawn into the nipple regardless of whether the bottle is in a vertical up or down position, or anywhere therebetween.

As a further aid in getting milk to the nipple when the contents of the bottle are diminishing to such an extent that the end of the flexible tube is no longer immersed therein, such as when the bottle is up-ended, there is provided a valve means on the top side of the circular member. Such means take the form of self-sealing nozzles indicated at 18. These nozzles are preferably made of a resilient material, such as rubber or other suitable plastic, that is molded into a tubular portion 19 that is collapsed at one end as at 20 so that opposed sides thereof are in face-to-face contact leaving a slit therein at the top as indicated generally at 21. These nozzles may be attached to the disk 13 in any suitable manner, the disk being provided with holes 22 spaced around the central opening through which the tube 16 passes. Around the holes 22 in the disk 13 may be provided upstanding sleeves 23 integrally connected thereto over which the nozzles can be slipped to be brought into frictional contact therewith. The sleeves may have an annular shoulder 24 to seat in a recess 25 of the cylindrical portion of the nozzle 18. Such nozzles may be easily removed for cleaning purposes or otherwise replaced. The valve portion 20 of such nozzles will permit the passage of milk to flow into the nipple when the bottle is up-ended because the slit portion 21 will sufficiently be separated especially upon suction created upon the nipple. However, the milk will not flow back into the bottle when the same is lowered because the walls of the nozzle on opposite sides of the slit will collapse under pressure of the milk.

Figure 4:
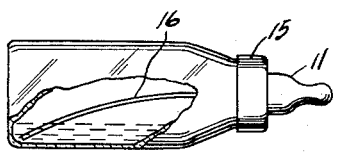
Fig. 4 is a side elevational view of the assembly with a portion broken from the bottle to illustrate the flexible nature of the tubular member.

The resilient or flexible nature of the tubular member 16 is shown in Fig. 4 whereby the same falls downwardly to the lower side wall of the bottle when the latter is up-ended as the same is being emptied of its contents. Upon further upward tilting when the end of the tube is no longer submerged, the milk will be thrown against the lower side of the disk 13 and passed through the nozzles 18.

It will thus be seen that the objects hereinbefore set forth may readily and efficiently be obtained and since certain changes may be made in the above article and different embodiments of the invention could be made without departing from the scope thereof, it is intended that all matter contained in the above description or Having described my invention what I claim as new and desire to secure by Letters Patent is:

1. In a flow control device for infant's feeding bottle and nipple, the improvement comprising a circular member of a diameter greater than the neck opening of said bottle and adapted to seat on the peripheral lip edge thereof to be held in position by said nipple, a tubular member adapted to extend from adjacent the bottom of said bottle through the center of said circular member a substantial distance on the other side thereof and well into the top of said nipple to maintain the latter substantially filled with milk once the same has passed through said tube, and self-sealing valve means on the top side of said circular member adapted to extend into the body of said nipple, whereby to permit the flow of milk thereto when the bottle is up-ended and to check the flow of milk therefrom when said nipple is up-ended.

2. In a device of the character defined in claim 1, and further characterized in that said circular member comprises a disk having a central opening therein frictionally to engage said tubular member, and at least one opening adjacent thereto connected with said valve means.

3. In a device according to claim 2, and wherein said disk is provided with a plurality of openings spaced around said central opening and tubular member and each of said openings being connected with self-sealing valve means.

4. In a device of the character defined in claim 1, and further characterized in that said self-sealing valve means comprises a plurality of self-sealing nozzles of resilient material molded into tubular form and substantially closed at one end in collapsed form except for a transverse slit, whereby milk will pass therethrough into said nipple when said bottle is up-ended, but will collapse to close said slit against the return of milk therethrough to said bottle from said nipple when the latter is up-ended.

5. In a device as defined in claim 1, and further characterized in that said tubular member is sufficiently flexible to enable the free end thereof to fall to a position adjacent the lower side of said bottle when the latter is up-ended through an arc of ninety degrees.

6. In a device as defined in claim 2, and wherein said disk is provided on its upper side with a plurality of circular flanges, and a plurality of self-sealing nozzles frictionally engaged with said flanges.

7. In a nursing bottle assembly which comprises, in combination, a bottle; a disk of a diameter to span the opening in the neck of the bottle and to seat against the peripheral lip thereof; a tubular member extending through the center of said disk on both sides thereof so that one end terminates adjacent the bottom of said bottle and the other end is adapted to extend a substantial distance into the top of a nipple; a plurality of self-sealing nozzles extending into the body of said nipple around said tubular member; a nipple having a flange resting on the top marginal edge of said disk; and a coupling engaging the neck of said bottle and overlying the flange of said nipple to urge the same into sealed engagement with said disk and the latter into sealed engagement with the lip of said bottle.

References Cited in the file of this patent

FOREIGN PATENTS

| | | |
|---|---|---|
| 84,970 | Australia | Aug. 10, 1921 |
| 287,382 | Germany | Sept. 18, 1915 |